(12) United States Patent
Ko

(10) Patent No.: US 11,445,581 B2
(45) Date of Patent: Sep. 13, 2022

(54) TRIAC MODULE

(71) Applicant: EFFIE CO., LTD., Yongin-si (KR)

(72) Inventor: Gowansoo Ko, Suwon-si (KR)

(73) Assignee: EFFIE CO., LTD., Yongin-si (KR)

( * ) Notice: Subject to any disclaimer, the term of this patent is extended or adjusted under 35 U.S.C. 154(b) by 0 days.

(21) Appl. No.: 17/418,194

(22) PCT Filed: Feb. 11, 2020

(86) PCT No.: PCT/KR2020/001883
§ 371 (c)(1),
(2) Date: Jun. 24, 2021

(87) PCT Pub. No.: WO2020/166928
PCT Pub. Date: Aug. 20, 2020

(65) Prior Publication Data
US 2022/0117052 A1    Apr. 14, 2022

(30) Foreign Application Priority Data
Feb. 12, 2019 (KR) ........................ 10-2019-0016395

(51) Int. Cl.
*H05B 45/10* (2020.01)
*H05B 45/20* (2020.01)
(Continued)

(52) U.S. Cl.
CPC ............. *H05B 45/10* (2020.01); *H05B 45/20* (2020.01); *H05B 45/30* (2020.01); *H05B 45/50* (2020.01); *H05B 47/16* (2020.01)

(58) Field of Classification Search
CPC .. H05B 45/10; H05B 45/3725; H05B 45/375; H05B 45/38; H05B 45/37; H05B 45/50;
(Continued)

(56) References Cited

U.S. PATENT DOCUMENTS 9,693,406 B2   6/2017 Kim et al.
9,980,355 B2   5/2018 Gim
(Continued)

FOREIGN PATENT DOCUMENTS

JP     2013-171702 A    9/2013
KR   10-2014-0102271 A   8/2014
(Continued)

OTHER PUBLICATIONS

KR Office Action dated Feb. 10, 2020 as received in Application No. 10-2019-0016395.
(Continued)

*Primary Examiner* — Monica C King
(74) *Attorney, Agent, or Firm* — Maschoff Brennan

(57) ABSTRACT

The present invention comprises: a TRIAC (110) operated by TRIAC driving current input to a gate terminal (g); a bridge diode (120) for full-wave rectifying current which is output from the gate terminal (g) of the TRIAC (110) or input to the gate terminal (g) of the TRIAC (110); a TRIAC triggering unit (130) which operates the TRIAC (110) by receiving current (I) output from the bridge diode (120) as an input and outputting a TRIAC driving current (I1) for turning on the TRIAC (110) to the gate terminal (g) of the TRIAC (110); and a latch circuit unit (140) for outputting latch current which is in a latch-on state and has a smaller value than critical current (Ith) of the TRIAC (110) to the gate terminal (g) of the TRIAC (110).

10 Claims, 4 Drawing Sheets

(51) Int. Cl.
*H05B 45/50* (2022.01)
*H05B 47/16* (2020.01)
*H05B 45/30* (2020.01)

(58) Field of Classification Search
CPC ...... H05B 45/385; H05B 47/10; H05B 47/19;
H05B 45/382; H05B 45/395; H05B
45/36; H05B 45/39; H05B 45/20; H05B
45/14; H05B 45/3578; H05B 47/155;
H05B 45/345; H05B 45/3575; H05B
47/24; H05B 47/16; H05B 45/31; H05B
47/115; H05B 45/00; H05B 39/044;
H05B 47/185; H05B 45/355; H05B
47/105; H05B 45/48; H05B 47/11; H05B
45/34; H05B 45/46; H05B 45/32; H05B
45/325; H05B 45/56; H05B 47/17; H05B
47/165; H05B 47/175; H05B 47/25;
H05B 41/295; H05B 45/30; H05B 47/12;
H05B 47/20; H05B 39/08; H05B
41/3927; H05B 45/315; H05B 45/357;
H05B 45/44; H05B 47/13; H05B 45/397;
H05B 47/135; H05B 47/18; H05B 6/105;
H05B 41/24; H05B 41/2828; H05B
41/2883; H05B 41/2928; H05B 41/3921;
H05B 45/12; H05B 45/392; H05B 45/40;
H05B 47/125; H05B 7/005; H05B 7/16;
H05B 39/086; H05B 39/088; H05B
41/16; H05B 41/2821; H05B 41/2827;
H05B 41/2851; H05B 41/2855; H05B
41/382; H05B 45/24; H05B 45/60; H05B
47/26; H05B 47/28; H05B 31/50; H05B
35/00; H05B 39/02; H05B 39/04; H05B
41/28; H05B 41/2853; H05B 41/2856;
H05B 41/2858; H05B 41/2885; H05B
41/2888; H05B 41/325; H05B 41/388;
H05B 41/39; H05B 45/28; H05B 45/58;
H05B 47/195; H05B 1/0216; H05B
1/0219; H05B 1/0227; H05B 1/0241;
H05B 2203/014; H05B 2213/05; H05B
3/0004; H05B 3/0023; H05B 3/0066;
H05B 39/041; H05B 39/048; H05B
41/245; H05B 41/282; H05B 41/2822;
H05B 41/2825; H05B 41/2983; H05B
41/2985; H05B 41/34; H05B 41/38;
H05B 41/3922; H05B 41/3924; H05B
41/44; H05B 45/18; H05B 45/327; H05B
45/35; H05B 45/42; H05B 47/14; H05B
47/22; H05B 6/065; H05B 6/1272; H05B
6/50; H05B 6/54; H05B 6/62; H05B
6/666; H05B 6/68; F21K 9/278; F21K
9/275; F21K 9/272; F21K 9/27; F21K
9/20; F21K 9/23; F21K 9/235; F21K
9/66; F21K 9/68; F21K 9/00; F21K
9/232; F21K 9/238; F21V 29/83; F21V
23/02; F21V 3/061; F21V 15/015; F21V
29/70; F21V 23/009; F21V 23/023; F21V
25/02; F21V 23/005; F21V 25/04; F21V
23/003; F21V 14/02; F21V 21/30; F21V
29/763; F21V 17/101; F21V 21/15; F21V
3/10; F21V 7/28; F21V 15/01; F21V
23/0442; F21V 19/003; F21V 21/00;
F21V 23/006; F21V 29/56; F21V 23/06;
F21V 25/10; F21V 3/062; F21V 7/22;
F21V 3/02; F21V 23/04; F21V 23/0464;
F21V 23/0471; F21V 19/009; F21V
25/00; F21V 29/51; F21V 3/00; F21V
7/005; F21V 17/02; F21V 17/104; F21V
19/001; F21V 19/0015; F21V 19/0045;
F21V 19/04; F21V 23/001; F21V 23/026;
F21V 29/54; F21V 29/60; F21V 29/63;
F21V 29/67; F21V 29/713; F21V 29/73;
F21V 29/74; F21V 29/85; F21V 31/005;
H02M 3/33507; H02M 1/32; H02M
1/007; H02M 1/08; H02M 1/36; H02M
1/0006; H02M 1/0009; H02M 3/33523;
H02M 3/33569; H02M 3/33592; H02M
1/0058; H02M 7/06; H02M 7/217; H02M
7/797; H02M 3/156; H02M 3/33515;
H02M 1/0032; H02M 1/10; H02M 7/219;
H02M 1/4225; H02M 1/44; H02M 3/158;
H02M 3/33576; H02M 5/293; H02M
1/12; H02M 1/126; H02M 3/1582; H02M
1/0012; H02M 3/157; H02M 5/2573;
H02M 5/458; H02M 1/322; H02M
1/4208; H02M 3/335; H02M 5/297;
H02M 7/4807; H02M 7/5387; H02M
1/008; H02M 1/088; H02M 1/346; H02M
1/4258; H02M 3/33584; H02M 3/3376;
H02M 7/1557; H02M 7/4815; H02M
7/5383; H02M 7/70; H02M 1/0045;
H02M 1/0085; H02M 1/081; H02M 1/34;
H02M 3/33561; H02M 5/10; H02M
5/225; H02M 7/02; H02M 7/04; H02M
7/2176; H02M 7/2195; H02M 1/0003;
H02M 1/083; H02M 1/14; H02M 3/07;
H02M 3/155; H02M 3/1588; H02M 3/22;
H02M 5/4585; H02M 7/003; H02M
7/062; H02M 7/10; H02M 7/155; H02M
7/44; H02M 7/53871; H02M 1/0048;
H02M 1/0054; H02M 1/009; H02M 1/15;
H02M 1/40; H02M 1/42; H02M 3/01;
H02M 3/1563; H02M 3/285; H02M
3/3353; H02M 3/33571; H02M 3/337;
H02M 5/257; H02M 5/2576; H02M
7/103; H02M 7/125; H02M 7/48; H02M
7/537; H02M 1/00; H02M 1/0025; H02M
1/0029; H02M 1/0035; H02M 1/0064;
H02M 1/0074; H02M 1/0077; H02M
1/0087; H02M 1/0096; H02M 1/123;
H02M 1/143; H02M 1/325; H02M 1/327;
H02M 1/342; H02M 1/344; H02M 1/348;
H02M 1/38; H02M 1/385; H02M 1/4233;
H02M 1/4241; H02M 1/4266; H02M
1/4291; H02M 11/00; H02M 3/1555;
H02M 3/1557; H02M 3/1586; H02M
3/33538; H02M 3/33546; H02M 3/33553;
H02M 3/33573; H02M 3/3382; H02M
5/04; H02M 5/271; H02M 5/2932; H02M
5/2935; H02M 5/40; H02M 7/05; H02M
7/064; H02M 7/066; H02M 7/1555;
H02M 7/1623; H02M 7/2173; H02M
7/30; H02M 7/4811; H02M 7/483; H02M 7/487; H02M 7/5152; H02M 7/538;
H02M 7/53803; H02M 7/53832; H02M
7/53875; H02M 7/53878
See application file for complete search history.

(56) References Cited

U.S. PATENT DOCUMENTS 11,239,656 B2 * 2/2022 Hastings ................. H02H 9/025
11,252,799 B2 * 2/2022 Li .......................... H05B 47/17

FOREIGN PATENT DOCUMENTS

| KR | 10-1530598 B1 | 6/2015 |
| KR | 10-2016-0032370 A | 3/2016 |
| KR | 10-2017-0082010 A | 7/2017 |

OTHER PUBLICATIONS

KR Decision to Grant dated Apr. 23, 2020 as received in Application No. 10-2019-0016395.

* cited by examiner

TRIAC MODULE

TECHNICAL FIELD

The present invention relates to a TRIAC element of an electrical device.

BACKGROUND ART

In general, a triode AC switch (TRIAC) has been used as a contactless switch element of an AC circuit, and there are two driving schemes for such a TRIAC.

One scheme is a scheme of performing control by receiving a separate external power. In this scheme, a separate power source and a control circuit unit are configured to provide a trigger signal to a gate terminal of the TRIAC, which is a controlling target. In other words, according to the scheme, a separate power line is provided to a TRIAC control circuit unit for operating the TRIAC, and a power is separately supplied to the TRIAC control circuit unit. Therefore, in this case, a total of three lines are connected, so that the scheme is also referred to as a three-wire scheme. This scheme has been generally and frequently adopted, but requires a separate power supply unit. In addition, the scheme is stable due to addition of the power line and addition of a power supply unit circuit, whereas the scheme has a great burden of expenses, and it is difficult to insert a configuration of the scheme into a standard switch.

The other scheme is a two-wire control scheme.

In this two-wire control scheme, a power line is connected to both ends of the TRIAC, and a control circuit unit is connected to the power line of the TRIAC, so that energy is supplied to the control circuit unit from both ends of T1 and T2 terminals of the TRIAC when the TRIAC is turned off.

However, since the two-wire control scheme according to the related art had to use both the T1 and T2 terminals, which are two terminals, a plurality of additional circuits are required in order to perform control at both ends of the two terminals, high current consumption is caused by the additional circuits, a power is very unstable, and a load is greatly influenced, so that there has been a big problem for commercialization.

Meanwhile, an LED has been widely used as a lighting lamp, and various control schemes have been applied to an LED load.

In particular, regarding the LED load, dimming and a color change of a lighting of the LED load have been controlled through an on-off switching operation of a wall-mounted operation switch that is attached to or embedded in a wall.

However, there has been an inconvenience and eye fatigue caused by excessive flickering of the lighting generated during a repetitive on-off process of the wall-mounted operation switch. In addition, a malfunction has occurred by excessive operation instability of a converter mounted in the load so as to provide a great deal of inconvenience to a user and become an obstacle to dissemination of technologies.

DETAILED DESCRIPTION OF THE INVENTION

Technical Problem

The present invention has been made to solve the problems of the related art as described above, and objects of a TRIAC module according to the present invention are as follows.

First, an object of the present invention is to provide a TRIAC module in which only a gate terminal and a T2 terminal of a TRIAC, not a T1 terminal and the T2 terminal of the TRIAC, may be connected in parallel with a bridge diode, and driving of the TRIAC may be controlled by a small latch current having a very small value (e.g., a current value of approximately 1 mA or less).

Second, an object of the present invention is to provide a TRIAC module in which a power is not supplied from the T1 terminal and the T2 terminal, which are both ends of the TRIAC, so that it is unnecessary to adopt a power supply unit connected to the T1 terminal and the T2 terminal, which are the both ends of the TRIAC, to drive the TRIAC.

Third, an object of the present invention is to provide a TRIAC module in which it is unnecessary to adopt a separate control power source for driving the TRIAC, so that stable driving may be performed.

Fourth, an object of the present invention is to provide a TRIAC module in which the driving of the TRIAC is controlled by using the small latch current having the very small value, so that a standby power of the TRIAC in an off state may be minimized, and thus power consumption may be reduced.

Fifth, an object of the present invention is to provide a TRIAC module in which a separate control power supply unit for driving the TRIAC is not required, so that a control circuit of the TRIAC may be miniaturized and may be implemented at a very low cost.

Sixth, an object of the present invention is to provide a TRIAC module in which an influence of the small latch current on an electrical device connected in series with the TRIAC may be minimized, and a leakage current upon turning-off of a switch may be minimized.

Seventh, an object of the present invention is to provide a TRIAC module in which the electrical device may be maintained in an operating state without being turned off for a set time (a first set time) even when an operation switch is switched off (i.e., load delay off), and while a load (which is the electrical device, for example, a lamp) is turned on as described above, control operations (e.g., a color change and dimming) for the load (the lamp) may be simultaneously performed by using (utilizing) a configuration of a delayed-turning-off circuit of the lamp, which is the load.

Eighth, an object of the present invention is to provide a TRIAC module in which the control operation (the color change or the dimming) for the load is performed while the load is turned on, so that flickering of the load, eye fatigue, and an inconvenience in a usage environment, which are problems caused by repeatedly turning the operation switch on and off to control the dimming or the color change for the load as in the related art, may be prevented, and excessive operation instability of a converter may be prevented.

Ninth, an object of the present invention is to provide a TRIAC module in which the TRIAC module may be manufactured as a single product connected in parallel with a wall-mounted operation switch embedded in or attached to a wall, so that the TRIAC module may be simply installed without changing a configuration or a structure of an existing wall-mounted operation switch or an existing line at all, and thus installation of the TRIAC according to the present invention may be very simple and easy to be performed by a general consumer even when a consumer is not a professional engineer.

Tenth, an object of the present invention is to provide a TRIAC module in which a latching state of a latch circuit unit may be maintained by a configuration in which the gate terminal of the TRIAC and the bridge diode are connected in parallel with each other, which is a unique wiring scheme of the present invention, even when the TRIAC is turned off, so that TRIAC module may be operated without a separate power source, and thus the TRIAC module may be suitable for implementing a non-power-source operation scheme.

Technical Solution

In order to achieve the objects as described above, according to the present invention, a TRIAC module connected to one power line of two power lines, which are configured to supply a power from a commercial AC power source to an electrical device, to switch the electrical device on and off includes: a TRIAC connected to the one power line of the two power lines configured to supply a current from the commercial AC power source to the electrical device, and operated by a TRIAC driving current input to a gate terminal to regulate power supply of the electrical device; a bridge diode connected in parallel with the gate terminal and a T2 terminal of the TRIAC, and configured to full-wave rectify a current that is output from the gate terminal of the TRIAC or input to the gate terminal of the TRIAC; a TRIAC triggering unit connected to an output terminal of the bridge diode, and configured to operate the TRIAC by receiving a current output from the bridge diode and outputting the TRIAC driving current for turning on the TRIAC to the gate terminal of the TRIAC; and a latch circuit unit latched on to output a latch current, which has a smaller value than a threshold current of the TRIAC, to the gate terminal of the TRIAC, wherein, when the latch circuit unit is latched on, the TRIAC triggering unit cuts off the output of the TRIAC driving current so that the TRIAC is switched off.

Advantageous Effects

The TRIAC module according to the present invention, which has the configuration as described above, has the following effects.

First, only a gate terminal and a T2 terminal of a TRIAC, not a T1 terminal and the T2 terminal of the TRIAC, can be connected in parallel with a bridge diode, and driving of the TRIAC can be controlled by a small latch current having a very small value (e.g., a current value of approximately 1 mA or less).

Second, a power is not supplied from the T1 terminal and the T2 terminal, which are both ends of the TRIAC, so that it is unnecessary to adopt a power supply unit connected to the T1 terminal and the T2 terminal, which are the both ends of the TRIAC, to drive the TRIAC.

Third, it is unnecessary to adopt a separate control power source for driving the TRIAC, so that stable driving can be performed.

Fourth, the driving of the TRIAC is controlled by using the small latch current having the very small value, so that a standby power of the TRIAC in an off state can be minimized, and thus power consumption can be reduced.

Fifth, a separate control power supply unit for driving the TRIAC is not required, so that a control circuit of the TRIAC can be miniaturized and can be implemented at a very low cost.

Sixth, an influence of the small latch current on an electrical device connected in series with the TRIAC can be minimized, and a leakage current upon turning-off of a switch can be minimized.

Seventh, the electrical device can be maintained in an operating state without being turned off for a set time (a first set time) even when an operation switch is switched off (i.e., load delay off), and while a load (which is the electrical device, for example, a lamp) is turned on as described above, control operations (e.g., a color change and dimming) for the load (the lamp) can be simultaneously performed by using (utilizing) a configuration of a delayed-turning-off circuit of the lamp, which is the load.

Eighth, the control operation (the color change or the dimming) for the load is performed while the load is turned on, so that flickering of the load, eye fatigue, and an inconvenience in a usage environment, which are problems caused by repeatedly turning the operation switch on and off to control the dimming or the color change for the load as in the related art, can be prevented, and excessive operation instability of a converter can be prevented.

Ninth, the TRIAC module can be manufactured as a single product connected in parallel with a wall-mounted operation switch embedded in or attached to a wall, so that the TRIAC module can be simply installed without changing a configuration or a structure of an existing wall-mounted operation switch or an existing line at all, and thus installation of the TRIAC according to the present invention can be very simple and easy to be performed by a general consumer even when a consumer is not a professional engineer.

Tenth, a latching state of a latch circuit unit can be maintained by a configuration in which the gate terminal of the TRIAC and the bridge diode are connected in parallel with each other, which is a unique wiring scheme of the present invention, even when the TRIAC is turned off, so that TRIAC module can be operated without a separate power source, and thus a non-power-source operation scheme can be implemented.

MODE FOR INVENTION

Figure 1:
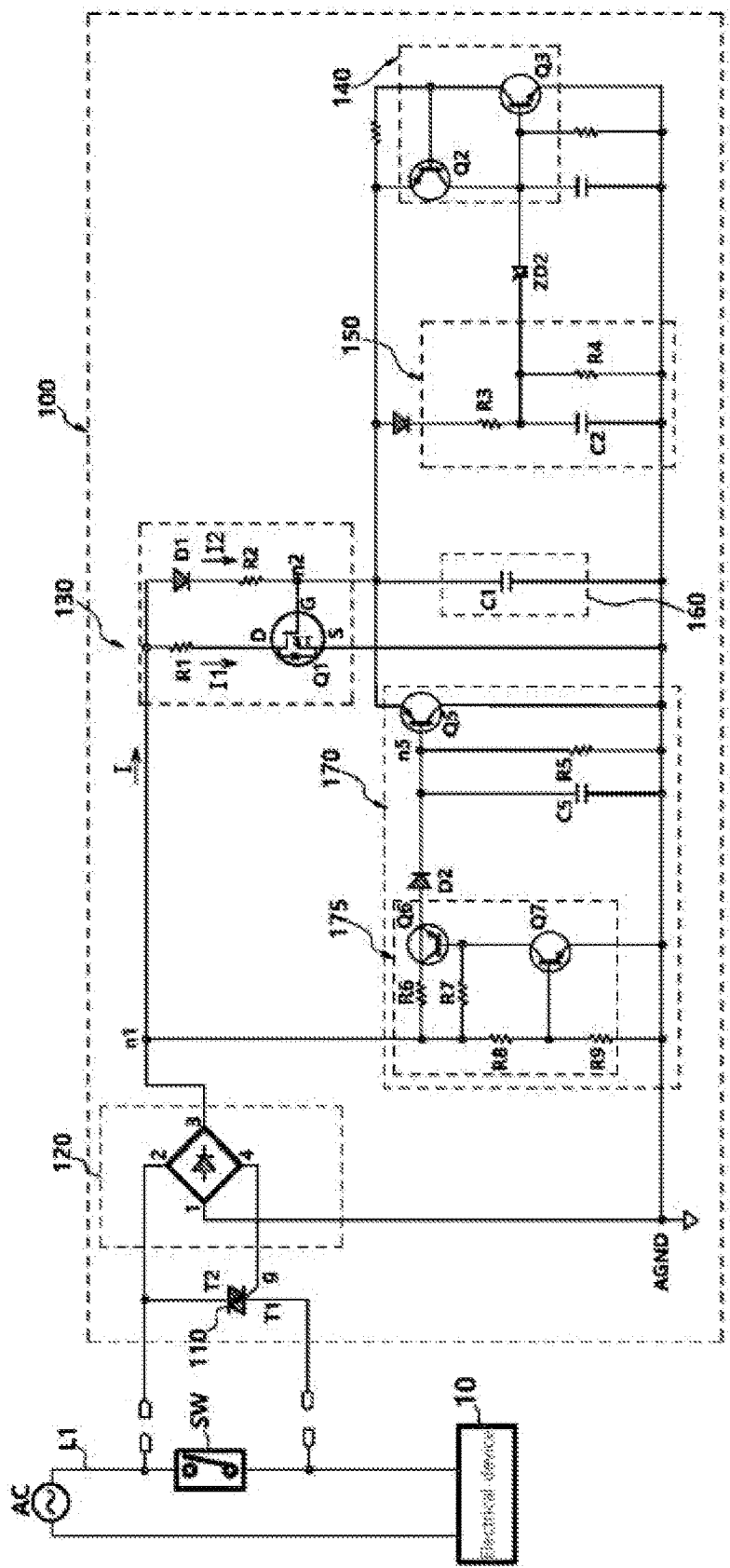
FIG. 1 is a circuit diagram showing a TRIAC module 100 according to one embodiment of the present invention.
Figure 2:
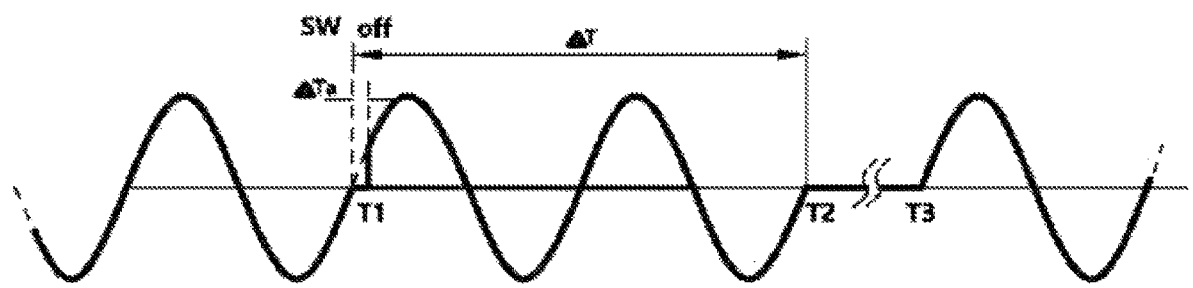
FIG. 2 is a waveform diagram showing a voltage applied to an electrical device 10 in which an operation switch SW is turned off at a time T1, and a latch circuit unit 14 is latched on at a time T2.

Hereinafter, a TRIAC module according to an exemplary embodiment of the present invention will be described in detail with reference to the accompanying drawings.

An electrical device described herein is a concept including electronic devices and electrical devices, and includes all devices operated by electricity.

A TRIAC module 100 according to one embodiment of the present invention may be configured such that components except for a TRIAC 110 are control circuits for controlling the TRIAC 110, in which various additional functions in addition to a basic switching operation are implemented in the control circuits.

The TRIAC module 100 according to one embodiment of the present invention may be based on a two-wire control scheme, and may be a technology related to a two-wire control scheme that does not require a separate power source to drive the TRIAC, in which the technology is connected to one power line L1 of two power lines, which are configured to supply a power from a commercial AC power source AC to an electrical device 10, to switch the electrical device 10 on and off.

According to one embodiment of the present invention, the TRIAC module 100 may include a TRIAC 110, a bridge diode 120, a TRIAC triggering unit 130, and a latch circuit unit 140.

The TRIAC 110 may be a component connected in series with the one power line L1 of the two power lines configured to supply a current from the commercial AC power source AC to the electrical device 10, and operated by a TRIAC driving current input to a gate terminal g to regulate power supply of the electrical device 10.

The gate terminal g of the TRIAC 110 may be wired in the same direction as a T1 terminal T1.

The bridge diode 120 may be a rectifying element connected in parallel with the gate terminal g and a T2 terminal T2 of the TRIAC 110, and configured to full-wave rectify a current that is output from the gate terminal g of the TRIAC 110 or input to the gate terminal g of the TRIAC 110 from the bridge diode 120.

The TRIAC triggering unit 130 may be a component connected to the bridge diode 120, configured to switch on the TRIAC 110 by receiving a full-wave-rectified current I output from the bridge diode 120 and outputting the TRIAC driving current I1 for turning on the TRIAC 110 to the gate terminal g of the TRIAC 110, and configured to cut off the output of the TRIAC driving current I1 at a time point when the latch circuit unit 140 is latched on.

The latch circuit unit 140 may be a component connected to the TRIAC triggering unit 130 (specifically, connected to a gate terminal G of a first switching element Q1 (e.g., a FET Q1) constituting the TRIAC triggering unit 130 as will be described below), and latched on when a latch trigger signal is input from an outside (e.g., a latch triggering unit 150) to output a latch current, which has a smaller value than a threshold current Ith for driving the TRIAC 110, to the gate terminal g of the TRIAC 110.

In addition, when the latch circuit unit 140 is latched on, the TRIAC triggering unit 130 may cut off the output of the TRIAC driving current I1 so that the TRIAC 110 may be switched off.

Accordingly, only the gate terminal g and the T2 terminal T2 of the TRIAC 110, not the T1 terminal T1 and the T2 terminal T2 of the TRIAC 110, may be connected in parallel with the bridge diode 120, and the driving of the TRIAC may be controlled by a small latch current having a very small value (e.g., a current value of approximately 1 mA or less).

In addition, a power may not be supplied from the T1 terminal T1 and the T2 terminal T2, which are both ends of the TRIAC 110, so that a power supply unit connected to the T1 terminal T1 and the T2 terminal T2, which are the both ends of the TRIAC 110, to drive the TRIAC 110 may not be required. Therefore, a separate control power source for driving the TRIAC may not be required, so that stable driving may be performed.

Further, the driving of the TRIAC 110 may be controlled by using the small latch current having the very small value, so that a standby power of the TRIAC 110 in an off state may be minimized.

In addition, a separate control power supply unit may not be required, so that a control circuit of the TRIAC 110 may be miniaturized and may be implemented at a very low cost.

An influence of the small latch current on an electrical device connected in series with the TRIAC may be minimized, and a leakage current of the electrical device 10 upon turning-off of a switch SW may be minimized.

In addition, the TRIAC driving current I1 and the latch current may be input to the gate terminal g of the TRIAC 110 after passing through the bridge diode 120.

Further, the TRIAC triggering unit 130 may include: a first switching element Q1 connected to an output terminal of the bridge diode 120; and a second resistor R2 connected in parallel with the first switching element Q1 at the output terminal of the bridge diode 120.

An output terminal of the first switching element Q1 and an output terminal of the latch circuit unit 140 may be connected to a first terminal 1 of the bridge diode 120; before the first switching element Q1 is switched on, the current I output from the bridge diode 120 may pass through the second resistor R2 to become a switching trigger current I2 having a small current value within a range of several mA; the switching trigger current I2 may trigger the first switching element Q1 so that the first switching element Q1 may be switched on; and when the first switching element Q1 is switched on, the output current of the bridge diode 120 may become the TRIAC driving current I1 so as to be input to the gate terminal g of the TRIAC 110 so that the TRIAC 110 may be driven.

In addition, the latch circuit unit 140 may be connected to an output terminal of the second resistor R2 (the gate terminal G of the first switching element Q1); when a latch trigger signal is input from the outside (e.g., the latch triggering unit 150), the latch circuit unit 140 may be latched on so that the first switching element Q1 may be switched off; and since the first switching element Q1 is turned off, the TRIAC driving current I1 may be cut off so that the T1 terminal T1 and the T2 terminal T2 of the TRIAC 110 may be switched off there between.

Further, when the latch circuit unit 140 is latched on so that the TRIAC 110 is switched off, the latch current may be maintained by an AC voltage applied between the T1 terminal T1 and the T2 terminal T2 of the switched-off TRIAC 110.

Accordingly, the TRIAC module may be operated without a separate power source.

When the latch circuit unit 140 is latched on so that the TRIAC 110 is switched off, the latch current may flow along a path formed by the T2 terminal T2 of the TRIAC 110, the bridge diode 120, the second resistor R2, the latch circuit unit 140, the bridge diode 120, the gate terminal g of the TRIAC 110, and the T1 terminal T1 of the TRIAC 110, so that the latch circuit unit 140 may be maintained in a latch-on state.

The latch circuit unit 140 may be configured as, for example, two transistors Q2 and Q3 configured to alternately operate.

The first switching element Q1 may be configured as a FET Q1, and a gate terminal G of the FET Q1 and the output terminal of the second resistor R2 may be connected to each other through a second node n2. Therefore, the latch circuit unit 140 may be connected to the second node n2.

A first resistor R1 may be connected in parallel with the second resistor R2 between the output terminal of the bridge diode 120 (n1) and an input terminal (a drain terminal D) of the first switching element Q1.

The first resistor R1 may have a relatively small resistance value ranging from 0 to several kΩ, and the second resistor R2 may have a relatively very large value as compared with the resistance value of the first resistor R1 (e.g., a resistance value that is $10^2$ to $10^6$ times the resistance value of the first resistor R1), so that current distribution may be performed.

In addition, the TRIAC module 100 may further include a first capacitor C1 connected to the second node n2 between the first switching element Q1 and the second resistor R2 to receive a charged voltage, and configured to supply an initial latch current for latching on the latch circuit unit 140 while the TRIAC 110 is turned on.

Accordingly, the initial latch current for latching on the latch circuit unit 140 while the TRIAC 110 is driven may be supplied to the latch circuit unit 140.

In addition, since the first capacitor C1 is wired to the second node n2, the charged voltage may be smoothly supplied.

Further, the TRIAC module 100 may further include a backflow prevention diode D1 connected between the output terminal of the bridge diode 120 and the second resistor R2 to block a back flow.

Hereinafter, a TRIAC module 100 according to another embodiment of the present invention will be described. The TRIAC module 100 according to another embodiment of the present invention, which will be described below, may be an application circuit of the TRIAC module 100 according to one embodiment of the present invention described above, in which the TRIAC 110 may be automatically turned off when a set time has elapsed after the TRIAC 110 is turned on.

The TRIAC module 100 according to another embodiment of the present invention may further include a latch triggering unit 150 in addition to the above-described components.

The latch triggering unit 150 may be a component connected to a second node n2 of the TRIAC triggering unit 130, connected in parallel with the latch circuit unit 140, and configured to output a latch trigger signal for latching on the latch circuit unit 140 when a first set time $\Delta T$ has elapsed after the first switching element Q1 is switched on, The latch circuit unit 140 may be latched on when the first set time $\Delta T$ has elapsed after the first switching element Q1 is switched on so that the TRIAC 110 may be automatically turned off when the first set time $\Delta T$ has elapsed after the TRIAC 110 is switched on.

The latch triggering unit 150 may include a second capacitor C2 connected to the second node n2 and charged by a voltage applied to the second node n2.

In addition, regarding the latch triggering unit 150, when a charged voltage of the second capacitor C2 is obtained by performing charging with a first reference voltage V1, the latch trigger signal may be output to the latch circuit unit 140 by the second capacitor C2 charged with the first reference voltage V1, the latch circuit unit 140 to which the latch trigger signal is input may be latched on so that the first switching element Q1 may be turned off, and a capacitance value of the second capacitor C2 may be set such that a time for which the second capacitor C2 is charged with the first reference voltage V1 is a first set time $\Delta T$.

In some embodiments, the latch triggering unit 150 may further include: a third resistor R3 connected between the output terminal of the second resistor R2 (n1) and the second capacitor C2; and a fourth resistor R4 connected in parallel with the second capacitor C2 at an output terminal of the third resistor R3.

The TRIAC module 100 may further include a second Zener diode ZD2 inserted between an input terminal of the second capacitor C2 and the latch circuit unit 140, and configured to allow the latch trigger signal to be input to the latch circuit unit 140 only when the second capacitor C2 has a voltage that is greater than or equal to the first reference voltage.

Although the latch triggering unit 150 has been illustratively described in the above example as being configured as the second capacitor C2, the present invention is not limited thereto, and any element capable of triggering the latch circuit unit 140 may fall within the technical scope of the present invention.

Hereinafter, a TRIAC module 100 according to still another embodiment of the present invention will be described.

The TRIAC module 100 according to still another embodiment of the present invention, which will be described below, may be another application circuit of the TRIAC module 100 according to one embodiment of the present invention described above, in which when a separate operation switch SW for turning the electrical device 10 on and off is provided, the TRIAC 110 may be connected in parallel with the operation switch SW, so that the TRIAC module 100 may function to automatically turn off an operation of the electrical device 10 after a set time (an off operation delaying function).

The TRIAC module 100 according to still another embodiment of the present invention may be provided in parallel with an operation switch SW connected in series with the one power line L1 of the two power lines, which are configured to supply the power from the commercial AC power source to the electrical device 10, to turn the electrical device 10 on and off.

In this case, the operation switch SW may be a wall-mounted operation switch SW that is embedded in or attached to a wall.

Since the TRIAC module 100 may be installed in parallel with the operation switch SW connected in series with the one power line L1 of AC power lines of the commercial AC power source as described above, the TRIAC module 100 may be installed without touching a pre-installed operation switch SW at all, so that an installation work may be very convenient and simple, and thus the installation may be performed by anyone who is not a professional engineer.

According to the TRIAC module 100 of still another embodiment of the present invention, the TRIAC 110 may be configured such that the T1 terminal T1 and the T2 terminal T2 of the TRIAC 110 are connected in parallel with the operation switch SW connected in series with the one power line L1 of the two power lines, which are configured to supply the power from the commercial AC power source AC to the electrical device 10, to turn the electrical device 10 on and off, and the TRIAC 110 is turned on only for a first set time from turning-off of the operation switch SW, and turned off when the first set time has elapsed.

According to the TRIAC module 100 of still another embodiment of the present invention, the bridge diode 120 may rectify an AC current when the operation switch SW is turned off, and may rectify the TRIAC driving current and the latch current, which are input to the gate terminal g1 of the TRIAC 110 from the TRIAC triggering unit 130 and the latch circuit unit 140, respectively.

According to the TRIAC module 100 of still another embodiment of the present invention, the TRIAC triggering unit 130 may switch on the TRIAC 110 by receiving the full-wave-rectified current I output from the bridge diode 120 and outputting the TRIAC driving current I1 for turning on the TRIAC 110 to the gate terminal g of the TRIAC 110 for the first set time $\Delta T$ as the operation switch SW is turned off.

According to the TRIAC module 100 of still another embodiment of the present invention, the latch circuit unit 140 may be latched off for the first set time ΔT, that is, during charging, and may be latched on when the first set time ΔT has elapsed to switch off the first switching element Q1 so that the TRIAC 110 may be switched off.

According to the TRIAC module 100 of still another embodiment of the present invention, the TRIAC module 100 may further include a latch triggering unit 150 connected to a second node n2 of the TRIAC triggering unit 130, connected in parallel with the latch circuit unit 140, and configured to output a latch trigger signal for latching on the latch circuit unit 140 when the first set time ΔT has elapsed after the first switching element Q1 is switched on, wherein the latch circuit unit 140 may be latched on when the first set time ΔT has elapsed after the first switching element Q1 is switched on so that the TRIAC 110 may be automatically turned off when the first set time ΔT has elapsed after the TRIAC 110 is switched on.

In addition, the latch triggering unit 150 may include a second capacitor C2 connected to the second node n2 and charged by a voltage applied to the second node n2. When a charged voltage of the second capacitor C2 is obtained by performing charging with a first reference voltage V1, the latch trigger signal may be output to the latch circuit unit 140 by the second capacitor C2 charged with the first reference voltage V1, the latch circuit unit 140 to which the latch trigger signal is input may be latched on so that the first switching element Q1 may be turned off, and a capacitance value of the second capacitor C2 may be set such that a time for which the second capacitor C2 is charged with the first reference voltage V1 is a first set time ΔT.

In some embodiments, the latch triggering unit 150 may further include: a third resistor R3 connected between the output terminal of the second resistor R2 (n1) and the second capacitor C2; and a fourth resistor R4 connected in parallel with the second capacitor C2 at an output terminal of the third resistor R3.

The TRIAC module 100 may further include a second Zener diode ZD2 inserted between an input terminal of the second capacitor C2 and the latch circuit unit 140, and configured to allow the latch trigger signal to be input to the latch circuit unit 140 only when the second capacitor C2 has a voltage that is greater than or equal to the first reference voltage.

Hereinafter, a TRIAC module 100 according to yet another embodiment of the present invention will be described.

The TRIAC module 100 according to yet another embodiment of the present invention, which will be described below, may additionally include an off-time generation unit 160 in the TRIAC module 100 according to another embodiment of the present invention described above, the electrical device 10 may be controlled during a time in which the operation switch SW is turned off and the TRIAC 110 is turned on.

According to the TRIAC module 100 of yet another embodiment of the present invention, the TRIAC module 100 may further include an off-time generation unit 160 connected to the second node n2, connected in parallel with the latch triggering unit 150, and configured to delay a switching-on operation of the TRIAC 110 to the electrical device 10 to turn off the electrical device 10 for an off-time ΔTa from a time point at which the operation switch SW is switched off to a time point at which the TRIAC 110 is switched on, that is, for an extremely short time, for example, 4 ms.

In this case, the electrical device 10 may monitor an off state of the off-time generation unit 160, and may recognize a switching-off state of the off-time generation unit 160 as a logic signal to perform a control operation.

Therefore, when the electrical device 10 is configured as a lamp, even after the operation switch SW is switched off, in a process of performing a lamp turning-off delaying operation of delaying turning-off of the lamp (the electrical device 10) to a time point after the first set time, the output of the trigger signal for driving the TRIAC 110 may be held for the off-time ΔTa, which is an extremely short time, without immediately switching on the TRIAC 110 as soon as the operation switch SW is turned off, and the off-time may be recognized as a logic signal, so that the lamp may be controlled.

Therefore, the above-described problems of conventional lamp operation control may be solved, and operations (e.g., a color change and dimming) of the lamp and a lamp delay off operation may be simultaneously performed, so that the operations (e.g. the color change and the dimming) may be controlled while the lamp is turned on, and thus an inconvenience of a user may be prevented, and an error of a transient operation of the converter may be reduced.

Meanwhile, even when the power is not supplied to the lamp 10 for the extremely-short off-time ΔTa, which is a time from the time point at which the operation switch SW is turned off to the time point at which the TRIAC110 is switched on, the off-time ΔTa may be an extremely short moment, so that the lamp 10 maybe continuously maintained in a turned-on state by a residual current existing in the lamp.

The electrical device 10 may be configured as a lamp, and may recognize the switching-off state as the color change to perform a color change operation.

The electrical device 10 may be configured as a lamp, and may recognize the switching-off state as the dimming to perform a dimming operation.

According to the TRIAC module 100 of yet another embodiment of the present invention, the off-time generation unit 160 may be configured as a first capacitor C1 connected to the second node n2 between the first switching element Q1 and the second resistor R2, connected in parallel with the latch triggering unit 150, and configured to delay the switching-on operation of the TRIAC 110 to the electrical device 10 to turn off the electrical device 10 for the off-time ΔTa from the time point at which the operation switch SW is switched off to the time point at which the TRIAC 110 is switched on.

When the first capacitor C1 is charged by a voltage applied to the gate terminal G of the first switching element Q1 along the second resistor R2 to reach a gate terminal trigger voltage Vg of the first switching element Q1, the first capacitor C1 may input a trigger current of the first switching element to the gate terminal G of the first switching element Q1.

According to the TRIAC module 100 of yet another embodiment of the present invention, the TRIAC module 100 may further include a discharge circuit unit 170 connected to an output terminal of the bridge diode 120 and the second node n2, and configured to discharge a voltage (which is a voltage applied to the second node n2) applied to the first capacitor C1 upon switching-on of the operation switch SW after the turning-off of the operation switch SW to perform the delaying through recharging from the switching-on of the operation switch SW after the turning-off of the operation switch SW to next switching-off of the operation switch SW.

When the operation switch SW is switched off, and the TRIAC 110 is switched on, the discharge circuit unit 170 may be charged to a fifth set voltage Vc5 by a current output from the bridge diode 120, in which the fifth set voltage Vc5 may have a greater value than the voltage of the second node n2, and when the operation switch SW is switched on, the charged voltage may be discharged so that the voltage may be lowered, and the discharge circuit unit 170 may discharge the voltage of the second node n2.

For example, the discharge circuit unit 170 may include: a fifth switching element Q5 connected to the second node n2; a fifth capacitor C5 connected between the output terminal of the bridge diode 120 and the fifth switching element Q5; and a fifth resistor R5 connected in parallel with the fifth capacitor C5.

The fifth switching element Q5 may be configured as a transistor.

The discharge circuit unit 170 may further include a current supply unit 175 connected to the output terminal of the bridge diode 120 to supply a current to the fifth capacitor C5.

Hereinafter, an operation of the TRIAC module 100 according to one embodiment of the present invention, which has the configuration as described above, will be described.

First, when the operation switch SW is in an on state (closed), the current of the commercial AC power source may flow only to the electrical device 10, and the current may not flow in the TRIAC module 100 connected in parallel with the electrical device 10.

Now, an operation of turning off (opening) the operation switch SW in order to switch off the electrical device 10 (turn off in a case of the lamp) will be described.

When the operation switch SW is turned off (opened), the AC current of the commercial AC power source may pass through the bridge diode 120 so that the first switching element Q1 may be switched on.

This is because the latch circuit unit 140 is in a latch-off state so that the current may not flow through the latch circuit unit 140, which causes the switching trigger current I2 to be input to the second resistor R2 having a relatively very large value, the first capacitor C1 is charged by the switching trigger current I2, and when the first capacitor C1 is charged to have a charged voltage that is sufficient for driving the first switching element Q1, the switching trigger current I2 becomes the trigger signal so as to be introduced into the gate terminal G of the first switching element Q1 so that the first switching element Q1 may be switched on.

When the first switching element Q1 is switched on so that the TRIAC driving current (e.g., 10 mA) passes through the bridge diode 120 so as to be input to the gate terminal g of the TRIAC 110, the TRIAC driving current being greater than or equal to the threshold current value Ith, the TRIAC 110 may be switched on so that the terminals T1 and T2 on both ends of the TRIAC 110 may be conductive.

Figure 3:
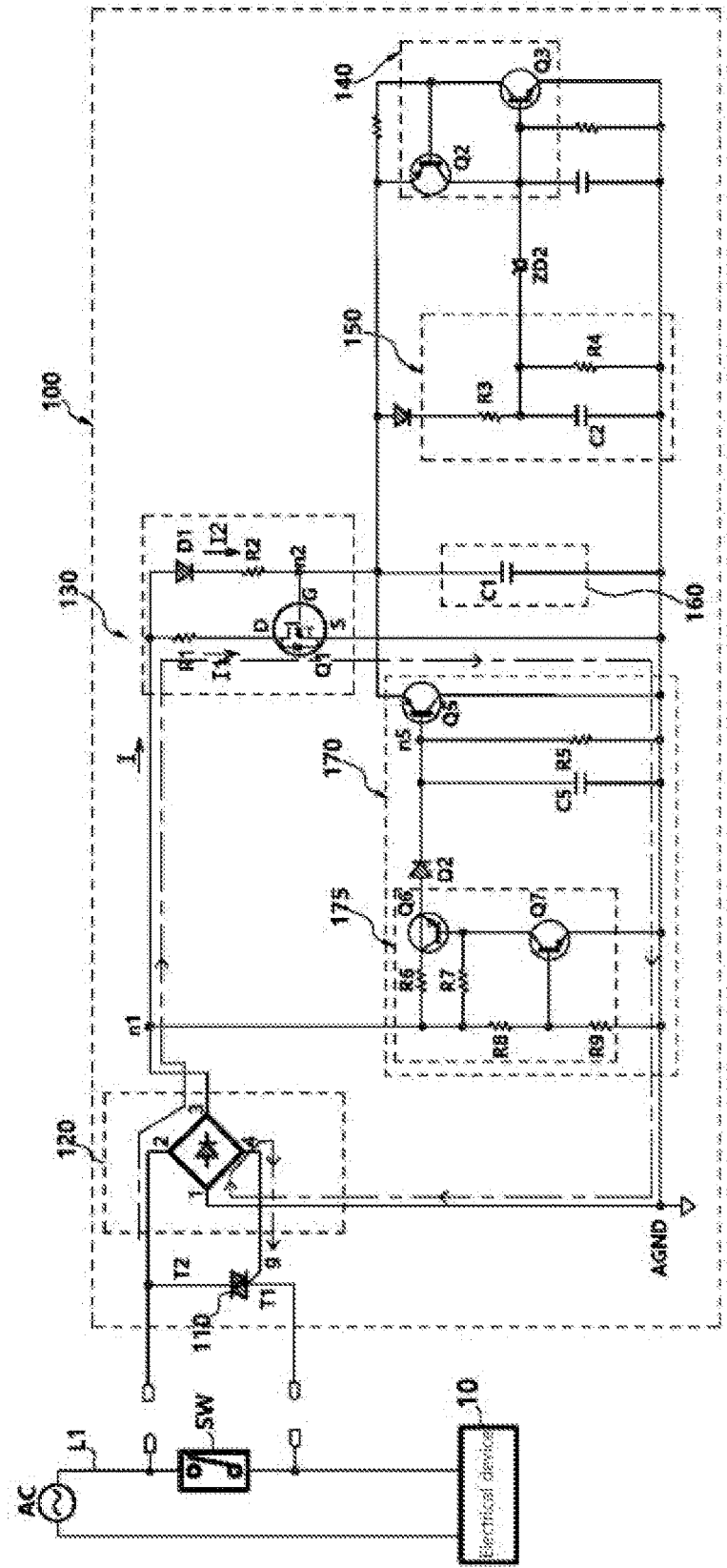
FIG. 3 is an operation diagram showing a current flow during a first set time ΔT in which a TRIAC 110 is switched on in the TRIAC module 100 according to one embodiment of the present invention.

As shown in FIG. 3, the TRIAC driving current I1 may flow in an order of the T2 terminal T2 of the TRIAC->the bridge diode 120 (input through a terminal 2->output through a terminal 3)->the first switching element Q1->the bridge diode (input through a terminal 1->output through a terminal 4)->the gate terminal g of the TRIAC 110 so that the TRIAC 110 may be switched on.

When the TRIAC 110 is switched on by the operation as described above, even when the operation switch SW is turned off, a commercial AC power may be input to the electrical device 10 so that the electrical device 10 may be turned on, and if the electrical device 10 is a lamp, a turned-on state of the lamp may be continuously maintained.

Meanwhile, the switching-off state may occur for the extremely-short time ΔTa from the time point at which the operation switch SW is turned off to the time point at which the TRIAC110 is turned on, and the electrical device 10 may recognize the off state as a logic signal to perform a control operation.

The first capacitor C1 may be charged with the switching trigger current at the time point at which the operation switch SW is turned off, and when the first capacitor C1 is charged until a gate driving voltage of the first switching element Q1 is reached, the switching trigger current may be input to the gate terminal of the first switching element Q1 so that the first switching element Q1 may be switched on.

Therefore, the switching-off state may occur by the first capacitor C1 for the time ΔTa from the time point at which the operation switch SW is turned off to the time point at which the TRIAC 110 is turned on, and when the switching-off state occurs, the electrical device 10, which is a load, may recognize the switching-off state as a logic signal to perform a load control operation by a pre-stored program.

Then, the switching trigger current I2 may be continuously charged to the second capacitor C2, and when the second capacitor C2 is charged to a voltage (the first reference voltage V1) that is sufficient to latch on the latch circuit unit 140 (since an off delaying operation of the electrical device 10 is performed for a time required for the charging, the electrical device 10 may be maintained in an on state even when the operation switch SW is turned off as described above), the latch trigger signal may be input to the latch circuit unit 140 so that the latch circuit unit 140 may be latched on.

When the latch circuit unit 140 is latched on, the initial latch current may flow to the latch circuit unit 140 by the charged voltage of the first capacitor C1, and the first switching element Q1 may be switched off.

When the first switching element Q1 is switched off, the TRIAC driving current may not flow, and the latch current may have a smaller value than the threshold current Ith, so that the T1 and T2 terminals T1 and T2, which are the both ends of the TRIAC 110, may be turned off.

Figure 4:
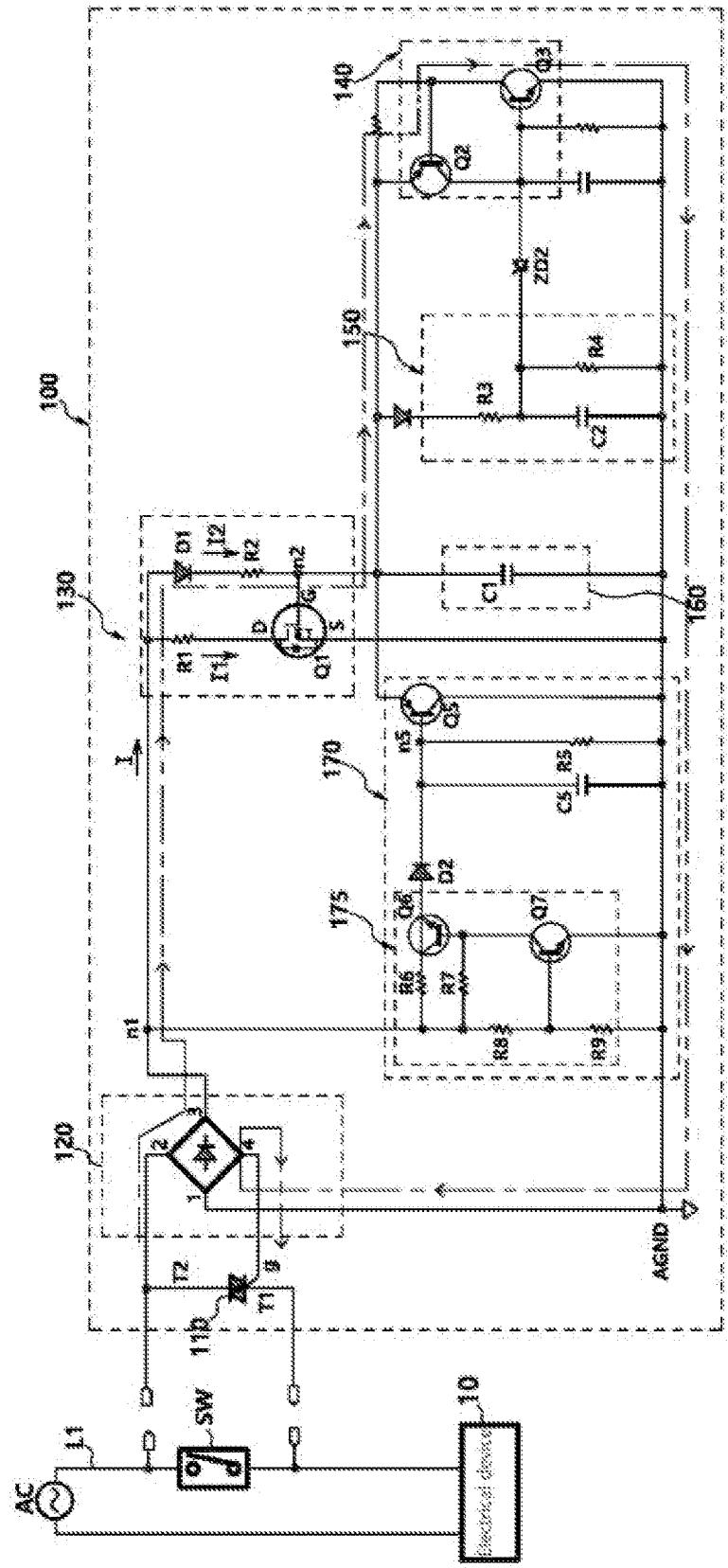
FIG. 4 is an operation diagram showing a current flow in which the latch circuit unit 140 is latched on so that the TRIAC 110 is switched off in the TRIAC module 100 according to one embodiment of the present invention.

As shown in FIG. 4, the latch current due to the first capacitor C1 may be input to the TRIAC 110 in an order of the latch circuit unit 140->the bridge diode 120 (input through the terminal 1->output through the terminal 4)->the gate terminal g of the TRIAC 110. Since the latch current has a smaller value than the threshold current Ith of the TRIAC, the TRIAC may be maintained in the switching-off state without being driven.

The reason why the latch circuit unit 140 may be continuously maintained in the latch-on state while the TRIAC110 is turned off by a latch-on operation of the latch circuit unit 140 as described above is that the present invention has a unique configuration, that is, the gate terminal g and the T2 terminal T2 of the TRIAC110 are connected in parallel with the bridge diode 120. This configuration will be described below.

When the TRIAC110 is opened, the AC voltage of the commercial AC power source may be applied between the T1 terminal T1 and the T2 terminal T2 of the TRIAC 110, and the latch current may continuously flow by the AC voltage applied between the T1 terminal T1 and the T2 terminal T2 of the switched-off TRIAC 110, so that the latch circuit unit 140 may be maintained in the latch-on state.

In a (+) period, the latch current may operate in an order of the T2 terminal T2 of the TRIAC 110->the bridge diode 120 (input through the terminal 2->output through the terminal 3)->the second resistor R2->the latch circuit unit 140->the bridge diode 120 (input through the terminal 1->output through the terminal 4)->the gate terminal g of the TRIAC 110->the T1 terminal T1 of the TRIAC->the electrical device 10.

Similarly, in a (−) period, the latch current may operate in an order of the T1 terminal T1 of the TRIAC 110->the gate terminal g of the TRIAC 110->the bridge diode 120 (input through the terminal 4->output through the terminal 3)->the second resistor R2->the latch circuit unit 140->the bridge diode 120 (input through the terminal 1->output through the terminal 2)->the commercial AC power source AC.

Hereinafter, an operation of the discharge circuit unit 170 will be described.

First, when the operation switch SW is switched off, and the TRIAC 110 is switched on, a charging operation may be performed on the discharge circuit unit 170.

When the TRIAC 110 is turned on, the fifth capacitor C5 may be charged, and the fifth capacitor C5 may be charged until the voltage Vc5 of the fifth capacitor C5 becomes a fifth set voltage (e.g., 6 V).

Since the charging is performed such that a level of the fifth set voltage Vc5 is greater than a level of a gate voltage Vn2 (e.g., 5 V) of the first switching element Q1, the fourth switching element Q5 may be turned off, so that the TRIAC driving current may be prevented from flowing over the fifth switching element Q5.

Then, the operation switch SW may be switched on, and at this point, the discharge circuit unit 170 may be operated.

When the operation switch SW is switched on, the voltage at the output terminal of the bridge diode 120 may become 0 V so as to allow the charged voltage of the fifth capacitor C5 to be discharged to the fifth resistor R5, and as the charged voltage Vc5 (e.g., 6 V), which is the fifth set voltage Vc5, drops, a level of the gate voltage Vn2 may become greater than a level of the charged voltage Vc5, so that the fifth switching element Q5 may be turned on, and the gate voltage Vn2 may be discharged so as to be less than or equal to the trigger voltage of the first switching element Q1.

As described above, an exemplary embodiment of the present invention has been discussed. It will be apparent to those having ordinary skill in the art that the present invention may be implemented in other specific forms in addition to the above-described embodiments without changing the technical idea or essential characteristics of the present invention. Therefore, the above-described embodiments are to be considered illustrative rather than restrictive.

The scope of the present invention is defined by the appended claims, not by the above detailed description, and should be construed as encompassing all changes or modifications derived from the meaning and the scope of the claims and equivalents thereof.

The invention claimed is:

1. A TRIAC module (100) connected to one power line (L1) of two power lines, which are configured to supply a power from a commercial AC power source (AC) to an electrical device (10), to switch the electrical device (10) on and off, the TRIAC module (100) comprising:
    a TRIAC (110) connected to the one power line (L1) of the two power lines configured to supply a current from the commercial AC power source (AC) to the electrical device (10), and operated by a TRIAC driving current input to a gate terminal (g) to regulate power supply of the electrical device (10);
    a bridge diode (120) connected in parallel with the gate terminal (g) and a T2 terminal (T2) of the TRIAC (110), and configured to full-wave rectify a current that is output from the gate terminal (g) of the TRIAC (110) or input to the gate terminal (g) of the TRIAC (110);
    a TRIAC triggering unit (130) connected to the bridge diode (120), and configured to operate the TRIAC (110) by receiving a current (I) output from the bridge diode (120) and outputting the TRIAC driving current (I1) for turning on the TRIAC (110) to the gate terminal (g) of the TRIAC (110); and
    a latch circuit unit (140) latched on to output a latch current, which has a smaller value than a threshold current (Ith) at which the TRIAC (110) is driven, to the gate terminal (g) of the TRIAC (110),
    wherein, when the latch circuit unit (140) is latched on, the TRIAC triggering unit (130) cuts off the output of the TRIAC driving current (I1) so that the TRIAC (110) is switched off.

2. The TRIAC module of claim 1, wherein the TRIAC driving current (I1) and the latch current are input to the gate terminal (g) of the TRIAC (110) after passing through the bridge diode (120).

3. The TRIAC module of claim 2, wherein the TRIAC triggering unit (130) includes:
    a first switching element (Q1) connected to an output terminal of the bridge diode (120); and
    a second resistor (R2) connected in parallel with the first switching element (Q1) at the output terminal of the bridge diode (120),
    an output terminal of the first switching element (Q1) and an output terminal of the latch circuit unit (140) are connected to the bridge diode (120), before the first switching element (Q1) is switched on, the current (I) output from the bridge diode (120) passes through the second resistor (R2) to become a switching trigger current (I2),
    the switching trigger current (I2) triggers the first switching element (Q1) so that the first switching element (Q1) is switched on, and,
    when the first switching element (Q1) is switched on, the output current of the bridge diode (120) becomes the TRIAC driving current (I1) so as to be input to the gate terminal (g) of the TRIAC (110) so that the TRIAC (110) is driven.

4. The TRIAC module of claim 3, wherein the latch circuit unit (140) is connected to an output terminal of the second resistor (R2),
    when a latch trigger signal is input, the latch circuit unit (140) is latched on so that the first switching element (Q1) is switched off, and,
    since the first switching element (Q1) is turned off, the TRIAC driving current (I1) is cut off so that a T1 terminal (T1) and the T2 terminal (T2) of the TRIAC (110) are switched off there between.

5. The TRIAC module of claim 3, further comprising a latch triggering unit (150) connected to a second node (n2) of the TRIAC triggering unit (130), connected to the latch circuit unit (140), and configured to output a latch trigger signal for latching on the latch circuit unit (140) when a first set time (ΔT) has elapsed after the first switching element (Q1) is switched on, wherein the latch circuit unit (140) is latched on when the first set time (ΔT) has elapsed after the first switching element (Q1) is switched on so that the TRIAC (110) is automatically turned off when the first set time (ΔT) has elapsed after the TRIAC (110) is switched on.

6. The TRIAC module of claim 1, wherein the TRIAC (110) is configured such that a T1 terminal (T1) and the T2 terminal (T2) of the TRIAC (110) are connected in T parallel with an operation switch (SW) connected in series with the one power line (L1) of the two power lines, which are configured to supply the power from the commercial AC power source (AC) to the electrical device (10), to turn the electrical device (10) on and off, and the RIAC (110) is turned on only for a first set time from turning-off of the operation switch (SW), and turned off when the first set time has elapsed, the bridge diode (120) rectifies an AC current when the operation switch (SW) is turned off, and rectifies the TRIAC driving current and the latch current, which are input to the gate terminal (g1) of the TRIAC (110) from the TRIAC triggering unit (130) and the latch circuit unit (140), respectively, the TRIAC triggering unit (130) operates the TRIAC (110) by receiving the current (I) output from the bridge diode (120) and outputting the TRIAC driving current (I1) for turning on the TRIAC (110) to the gate terminal (g) of the TRIAC (110) for the first set time ($\Delta T$) as the operation switch (SW) is turned off, and the latch circuit unit (140) is latched off for the first set time ($\Delta T$), and latched on when the first set time ($\Delta T$) has elapsed to switch off the first switching element (Q1) so that the TRIAC (110) is switched off.

7. The TRIAC module of claim 6, further comprising a latch triggering unit (150) connected to a second node (n2) of the TRIAC triggering unit (130), connected to the latch circuit unit (140), and configured to output a latch trigger signal for latching on the latch circuit unit (140) when the first set time ($\Delta T$) has elapsed after the first switching element (Q1) is switched on, wherein the latch circuit unit (140) is latched on when the first set time ($\Delta T$) has elapsed after the first switching element (Q1) is switched on so that the TRIAC (110) is automatically turned off when the first set time ($\Delta T$) has elapsed after the TRIAC (110) is switched on.

8. The TRIAC module of claim 7, further comprising an off-time generation unit (160) connected to the second node (n2), connected in parallel with the latch triggering unit (150), and configured to delay a switching-on operation of the TRIAC (110) to the electrical device (10) to turn off the electrical device (10) for an off-time ($\Delta Ta$) from a time point at which the operation switch (SW) is switched off to a time point at which the TRIAC (110) is switched on, wherein the electrical device (10) monitors an off state of the off-time generation unit (160), and recognizes a switching-off state of the off-time generation unit (160) as a logic signal to perform a control operation.

9. The TRIAC module of claim 8, wherein the off-time generation unit (160) is configured as a first capacitor (C1) connected to the second node (n2) between the first switching element (Q1) and a second resistor (R2), connected in parallel with the latch triggering unit (150), and configured to delay the switching-on operation of the TRIAC (110) to the electrical device (10) to turn off the electrical device (10) for the off-time ($\Delta Ta$) from the time point at which the operation switch (SW) is switched off to the time point at which the TRIAC (110) is switched on.

10. The TRIAC module of claim 9, further comprising a discharge circuit unit (170) connected to an output terminal of the bridge diode (120) and the second node (n2), and configured to discharge a voltage applied to the first capacitor (C1) upon switching-on of the operation switch (SW) after the turning-off of the operation switch (SW) to perform the delaying through recharging from the switching-on of the operation switch (SW) after the turning-off of the operation switch (SW) to next switching-off of the operation switch (SW).

* * * * *